June 28, 1960
V. SIRAVO
2,942,580
PRESSURE OPERATED ROTARY DEVICE
Filed Nov. 12, 1958
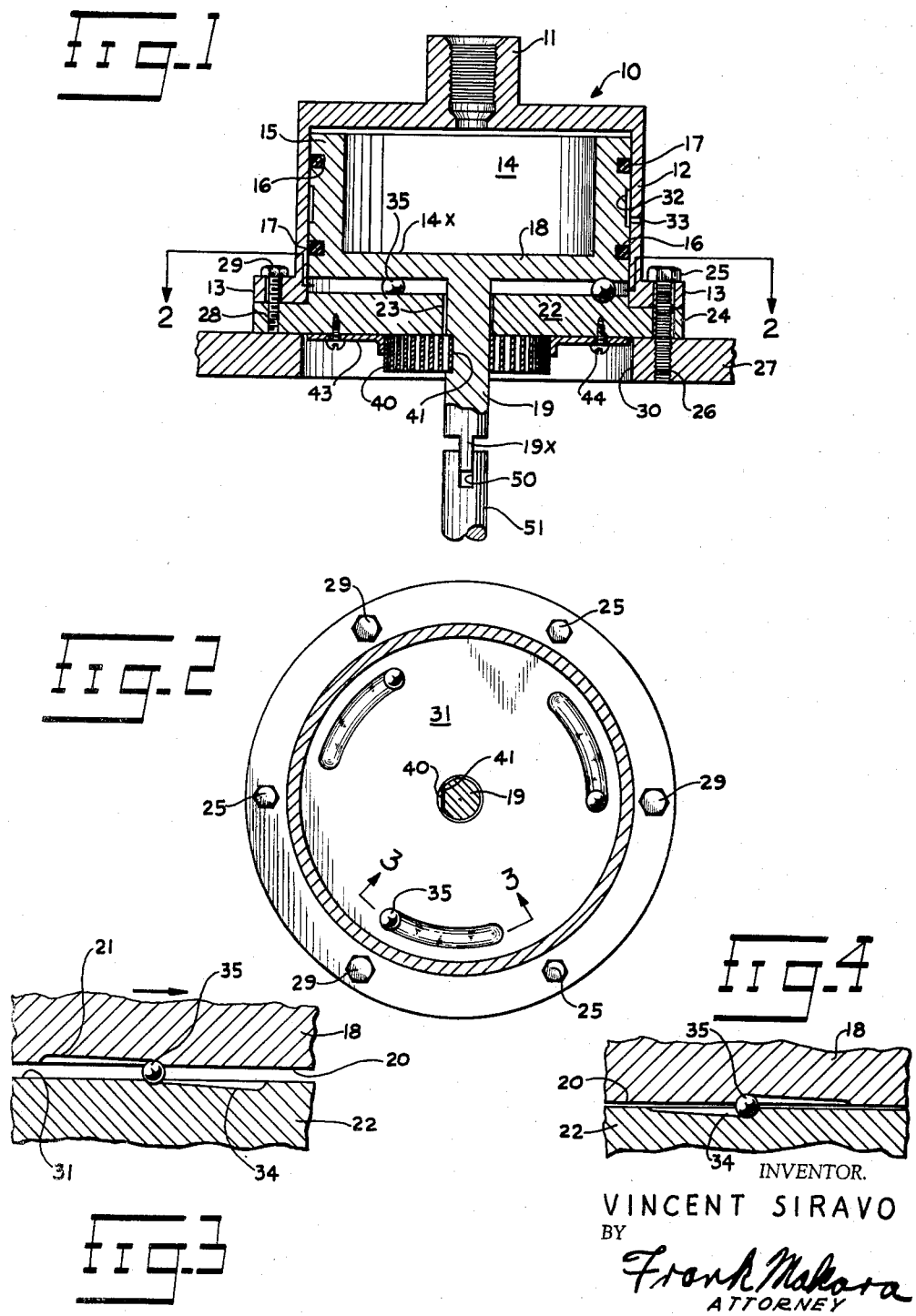
INVENTOR.
VINCENT SIRAVO
BY
Frank Makara
ATTORNEY United States Patent Office 2,942,580
Patented June 28, 1960

2,942,580
PRESSURE OPERATED ROTARY DEVICE
Vincent Siravo, 3 Dolores Place, Middletown, N.J.
Filed Nov. 12, 1958, Ser. No. 773,414
3 Claims. (Cl. 121—38)

This invention relates to a rotary device and more particularly to a device having fluid therein whereby pressure applied to said fluid rotates an element in contact with said fluid.

It is an object of this invention to provide a device whereby fluid pressure is converted into limited rotary movement.

It is another object to provide a device whereby fluid pressure is used to operate a valve.

These and other objects of this invention will become apparent upon reading the following descriptive disclosure taken in conjunction with the accompanying drawing in which:

Fig. 1 is a vertical section of the fluid pressure converting device,

Fig. 2 is a section view taken on line 2—2 of Fig. 1 and showing three balls disposed in three inclined grooves in a stator, Fig. 3 is a section view of a ball disposed captively in a pair of co-acting grooves prior to rotation of the top element or rotor, and Fig. 4 is a section view similar to Fig. 3 showing the position of the ball after rotation of the rotor due to downward fluid pressure exerted thereon.

Turning to the drawing a cylindrical housing 10 is provided with an integral internally threaded inlet stud 11 on its top wall. The housing is further provided with a circular depending wall 12 of suitable height. A horizontally disposed flange 13 is provided integral with the bottom edge of wall 12 and a plurality of non-threaded apertures are provided in flange 13.

The interior of housing 10 is a cylindrical cavity having a round smooth vertical wall and a flat top wall having an inlet aperture 11 therein.

A rotor 14 having a centrally disposed cup cavity therein is provided with an upright circular wall 15 of a diameter to fit in suitable close contact with the inner surface of depending wall 12.

Wall 15 is provided with preferably a pair of annular grooves 16 and a rubber or plastice O-ring 17 of suitable diameter is disposed in each groove 16. While I prefer a pair of O-rings and co-acting channels a single O-ring gasket and channel is operable in this invention.

The rotor 14 is provided with a horizontally disposed bottom wall 18 having an integral centrally disposed rod 19. The bottom surface 20 of bottom wall 18 is provided with a plurality of suitable upwardly inclined grooves 21 (Figs. 3 and 4), preferably three grooves 21.

A circular stator 22 having a centrally disposed aperture 23 is provided with a peripheral lip 24 having a plurality of threaded and non-threaded bolt receiving apertures therein.

The rod 19 of rotor 14 is disposed through the aperture 23 of the stator 22. The stator 22 is secured by bolts 25 into suitable threaded apertures 26 of a stationary element 27, for example, a valve housing top wall. The housing 10 is secured into the suitable threaded apertures 28 of the lip 24 by bolts 29. Preferably at least three equally spaced-apart threaded apertures 28 are provided in stator lip 24. Also at least three equally spaced-apart threaded apertures 26 are disposed in valve housing top wall 27 about the large aperture 30 therein to receive the threaded bolt 25 passed through the non-threaded corresponding apertures in flange 13 of housing 10 and lip 24 of stator 22. A gasket may optionally be provided between flange 13 and lip 24 and it may consist of brushing on suitable plastic, rubber or asphalt paint. Also the rotor 14 is preferably provided with a circular groove 32 on the exterior surface of the upright rotor wall 15, said groove being in contact with a vent hole 33 disposed in the housing wall 12.

Turning now to Fig. 2, the stator top circular wall 31 is provided with three declining grooves 34 of suitable contour to captively retain a ball 35 in conjunction with the grooves 21 of rotor 14.

In short, the number of ball retaining grooves 21 in rotor wall 18 is in number equal to and of similar configuration to the ball retaining grooves 34 of stator 22.

As shown in Fig. 1, the balls 35 are captively held in the co-acting grooves 21 and 34 at all times so that the rotor 14 is supported upon balls 35 and as the rotor rolls so also do the balls 35.

Turning to Fig. 1, oil or air having suitable fluid pressure, for example, compressed air or pumped oil, is conducted through the aperture of inlet stud 11 into the cavity of the rotor 14 where the pressure is exerted on the flat horizontal wall 14X of the rotor cavity. This downward pressure causes the balls 35 to rotate in their respective co-acting grooves so that the balls 35 in effect roll down the inclined plane of the declining grooves 34 of stator 22 until the ball 35 is prevented from further rotation upon hitting the lowest part of the groove 34. At the limit of downward movement the rotor bottom wall 20 approaches the top wall 31 of the stator 22 and the balls 35 are disposed in the deepest cavity portion of each respective pair of co-acting grooves 21 and 34 (Fig. 4).

However during this movement of the rotor 14 relative to the stator 22 (Fig. 3 to Fig. 4) the rotor 14 is the only element that rotates or rolls on the balls 35 since the stator 22 is bolted to the valve housing 27. Thus the pressure of oil on rotor wall 14X is converted to rotation of the rotor 14 a limited amount equal to the circumferential length of the co-acting grooves 21 and 34.

Clearly to effect a complete rotation of 360 degrees of the rotor 14 and its rod 19 a succession of rotary pulses are supplied.

However for valve operation complete rotation of the rod 19 is not needed since the rod 19 may be rotated clockwise by pressure movement of the rotor 14 to open the valve and spring means provided to return the rotor 14 and the valve rod 19 back to its closed position.

To effectuate this return of rod 19 to its initial position a coil spring 40 is employed. Moreover, the rod 19 is provided with a suitable flat area 41 and the coil 40 is provided with a suitable inner flat terminal portion (Fig. 2) adapted to engage the flat area 41 of rod 19 thereby preventing free rotation of the coil spring about rod 19.

The coil spring 40 is suitably wound up and disposed in a circular retaining flanged collar 43 which is secured as by metal screws 44 or welding to the under surface of the stator 22 about its central aperture 23. Thus rotation of the rotor 14 and therefore of rod 19 further winds up the coil spring 40 so that release of fluid pressure on the rotor 14 causes the rotor to be returned by spring 40 to its original position (Fig. 3).

This invention thus may be used in conjunction with suitably applied pulsations of fluid pressure on rotor 14 to completely rotate the rod 19 by a succession of pulses or the rotor 14 may be made to move alternately a limited number of degrees clockwise (or counterclockwise depending on the direction of pitch of the co-acting grooves 21 and 34) only to be returned by spring means to the starting position of the rotor upon release of fluid pressure.

This invention therefore has a vast number of uses, for example, for operation of valves even at remote distances or even for pulsatory operation of a rod 19 intermittently so as to effect selective operation of switches (not shown) secured to said rod 19.

Rod 19 may be provided with a tongue 19X so that it may be keyed into a co-acting slot 50 of any shaft 15 which is to be operated intermittently in a pulsatory manner.

Broadly speaking, this invention changes pulsating fluid pressure to rotary movement of a limited number of degrees for each pulsation applied.

The degrees of rotation per pulsation depends on the length of the groove and since at least three sets of co-acting grooves are preferred it is seen the amount of rotation per pulsation is necessarily less than 120 degrees.

This invention is of universal application so that it is not limited to operation of valves although operation of ball valves is one of the preferred uses of this invention.

I claim:

1. A device for converting fluid pressure into rotary motion comprising a stationary housing having a chamber therein a cylindrical cavity containing piston rotor having a depending rod disposed in said chamber of said housing, said piston being simultaneously actuated linearly and rotationally; means for sealing said moveable piston to said housing in fluid tight moveable relationship; a stationary stator having an aperture therein disposed beneath said rotor, said depending rod of said rotor being disposed through said stator aperture, a plurality of upwardly inclined ball receiving racer grooves disposed about said rod in the bottom wall of said piston, a plurality of co-acting downwardly inclined ball receiving racer grooves disposed in said stator about said stator aperture, the lower-most portion of said grooves of said rotor being normally disposed respectively over the top-most portion of said downwardly inclined grooves of said stator thereby forming a plurality of pairs of grooves, and a ball disposed in each pair of grooves in contact with each groove whereby fluid pressure applied in said piston effects linear movement of said piston rotor which in turn effects rotation of said piston rotor a limited number of degrees.

2. The device of claim 1 wherein said stator is provided with three downwardly inclined equally long ball receiving grooves equi-distant peripherally from one another and said rotor being provided with three upwardly inclined ball receiving grooves of length equal to that of said stator grooves.

3. The device of claim 1 having coil spring means secured to said rod for returning said rotor from its actuated position back to its normal position upon release of fluid pressure on said piston.

References Cited in the file of this patent

UNITED STATES PATENTS

| | | |
|---|---|---|
| 951,318 | Kjerulff | Mar. 8, 1910 |
| 2,315,775 | D'Arcey | Apr. 6, 1943 |
| 2,334,834 | Newell | Nov. 23, 1943 |
| 2,566,571 | Leland | Sept. 4, 1951 |
| 2,828,636 | Hall | Apr. 1, 1958 |